May 24, 1960 W. A. CLAUS 2,937,540
FOOT-OPERATED PARKING BRAKE OPERATING MECHANISM
Filed Oct. 20, 1958 2 Sheets-Sheet 1

INVENTOR.
WILLIAM A. CLAUS
BY
ATTORNEYS

May 24, 1960 W. A. CLAUS 2,937,540
FOOT-OPERATED PARKING BRAKE OPERATING MECHANISM
Filed Oct. 20, 1958 2 Sheets-Sheet 2

INVENTOR.
WILLIAM A. CLAUS
BY
ATTORNEYS

United States Patent Office 2,937,540
Patented May 24, 1960

2,937,540

FOOT-OPERATED PARKING BRAKE OPERATING MECHANISM

William A. Claus, Toledo, Ohio, assignor to The Peters Stamping Company, Perrysburg, Ohio, a corporation of Ohio Filed Oct. 20, 1958, Ser. No. 768,217

7 Claims. (Cl. 74—512)

This invention relates to parking brakes and more particularly to parking brakes of a foot-operated type with novel release means therefor.

Foot-operated parking brake levers are becoming increasingly popular for passenger cars. More pressure can be applied with these brake levers and they can be more easily operated by women. The release mechanisms for such levers are frequently hard to operate, however, or require considerable movement of a release arm to effect releasing.

Apparatus according to the present invention provides a parking brake operating lever with an improved holding mechanism that requires little force and a minimum of movement to set or release. The new release mechanism is also highly reliable and the brake lever cannot be released without movement of the release arm. In the new mechanism, the brake setting lever is held in a set position by a ratchet rack and pawl. The lever is released when the ratchet rack is pulled away from the pawl by means of a release member pivotally connected to the ratchet rack through a connecting member that is pivotally attached to both a portion of the release member and a portion of the rack. The connecting member is so constructed and located as to produce a further locking force when the brake lever is set and to aid in releasing the brake when the release member is operated.

It is, therefore, a principal object of the invention to provide a parking brake operating lever of the foot-operated type having improved release mechanism.

Another object of the invention is to provide a parking brake operating lever having a release mechanism that can be operated with less force and movement than those presently in use.

A further object of the invention is to provide release mechanism for a parking brake operator, which mechanism produces a greater locking force when the brake is set and which also aids in releasing the brake operator when the release mechanism is operated.

Still another object of the invention is to provide an improved release mechanism which comprises a release member connected to a ratchet rack by a connector pivotally attached to portions of the release arm and ratchet rack.

Other objects of the invention will be suggested from the following detailed description of a particular embodiment thereof, reference being made to the accompanying drawings, in which—

Figure 5:
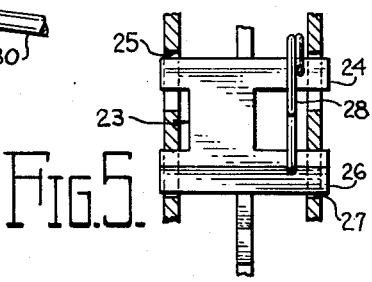
Fig. 5 is a view taken along the line 5—5 of Fig. 4.
Figure 4:
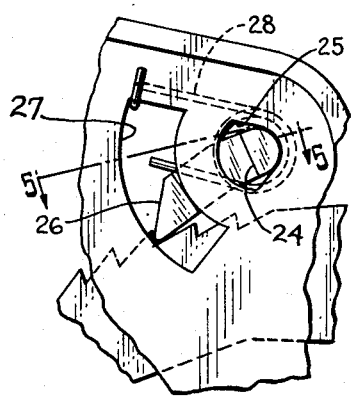
Fig. 4 is a detailed view of a pawl and a portion of a ratchet rack when the brake operating mechanism is in the set position.

One form of apparatus embodying the invention is shown as a foot-operated parking brake operating assembly 11. This includes a mounting bracket 12, a foot-operated brake lever 13, a ratchet rack 14, and release mechanism 15. The bracket 12 includes a composite mounting plate 16 which can be mounted to a panel of a vehicle in which the brake assembly is used. The composite mounting plate 16 is made up of similar side plates 17 and 18 which are assembled in spaced relationship for only a portion of their extent to receive other operating parts as hereinafter described. The lever 13, in the form shown, has forked legs 19 and 20 which are located on the outer sides of the plates 17 and 18 and are pivoted thereto at 21 by a pin extending through both of the legs 19 and 20 and both of the plates 17 and 18. The lever 13 has a toe plate 22 at its lower end and a pawl 23 at its upper end, which pawl is pivotally attached to the legs 19 and 20 by an axis 24 (see Figs. 4 and 5) integral with the pawl 23 and extending through sector-shaped holes 25 in the legs. The pawl 23 also has a ratchet rack-engaging portion 26 which longitudinally extends through arcuate holes 27 in the legs 19 and 20 to limit arcuate movement of the pawl. A spring 28 is wound around a portion of the axis 24 with one end bearing against the left end of one of the arcuate holes 27 and the other end against the rack-engaging portion 26, to maintain the portion 26 against the teeth of the rack 14, when the brake is set.

Figure 1:
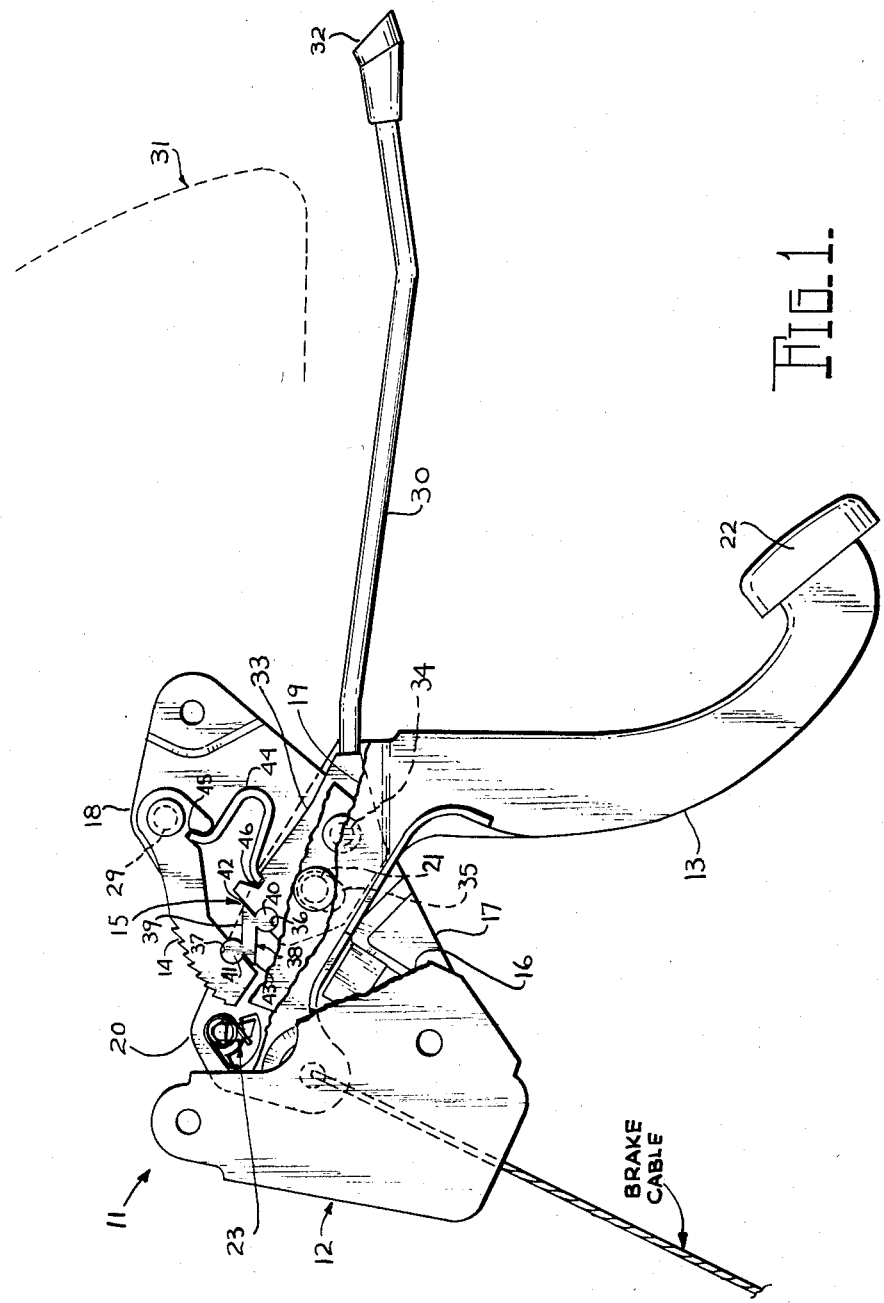
Fig. 1 is a view in elevation, with parts broken away and parts in cross section, of a parking brake operating mechanism according to the invention.
Figure 2:
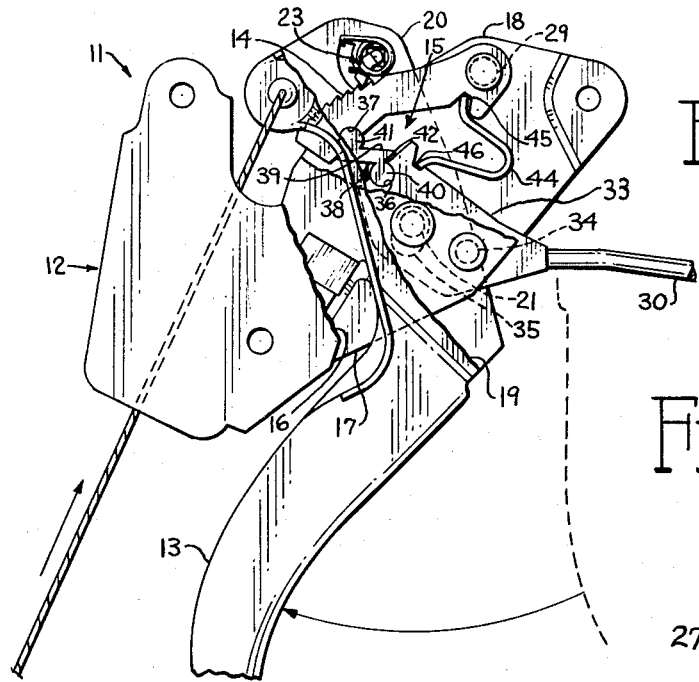
Fig. 2 is a view of a portion of the brake operating mechanism shown in Fig. 1 with a brake operating lever shown in a set position.

The teeth of the ratchet rack 14, which is pivotally held by a pin 29 that extends through the upper portion of both of the side plates 17 and 18, are engaged by the portion 26 of the pawl 23 when the rack is in an outward position and the toe plate 22 of the lever 13 is pushed toward the left in Fig. 1, thereby moving the upper end of the lever 13 upwardly and toward the right, over the rack 14 as shown in Fig. 2. This action pulls the brake cable, indicated by dotted lines, upwardly and sets the brake. The brake is thereby set until the lever 13 is released and the upper end moved downwardly to its original position.

The ratchet release mechanism 15 of the present invention includes, in the form shown, a pivoting means or release lever 30 extending beyond a dashboard of the automobile and indicated at 31. A handle 32 is attached to the outer end of the lever in a convenient position for the operator and a release member or plate 33 is attached to the opposite end of the lever, with the release member located between the side plates 17 and 18 and pivoted thereto by a pin 34 which may in one form be spaced from the pivot 21 of the foot lever 13. If the pin 34 is spaced from the pivot pin 21 a slot 35 must be provided in the release member 33 around the pivot 21 to enable rotatable movement of the member without interfering with the pivot 21 for the main lever 13. The member 33 also has a recess or socket 36 in the shape of a circle segment which is more than a semi-circle, and a lower portion of the rack 14 has a similar recess 37. A connector 38 pivotally connects the rack 14 and the member 33 and comprises an intermediate portion 39 and segment shaped heads 40 and 41 which fit into the recesses or sockets 36 and 37. The intermediate portion 39 of the connector has diagonally opposed shoulders 42 and 43 which bear against the release member 33 and the lower edge of the ratchet rack 14 to limit clockwise rotation of the connector 38.

Figure 3:
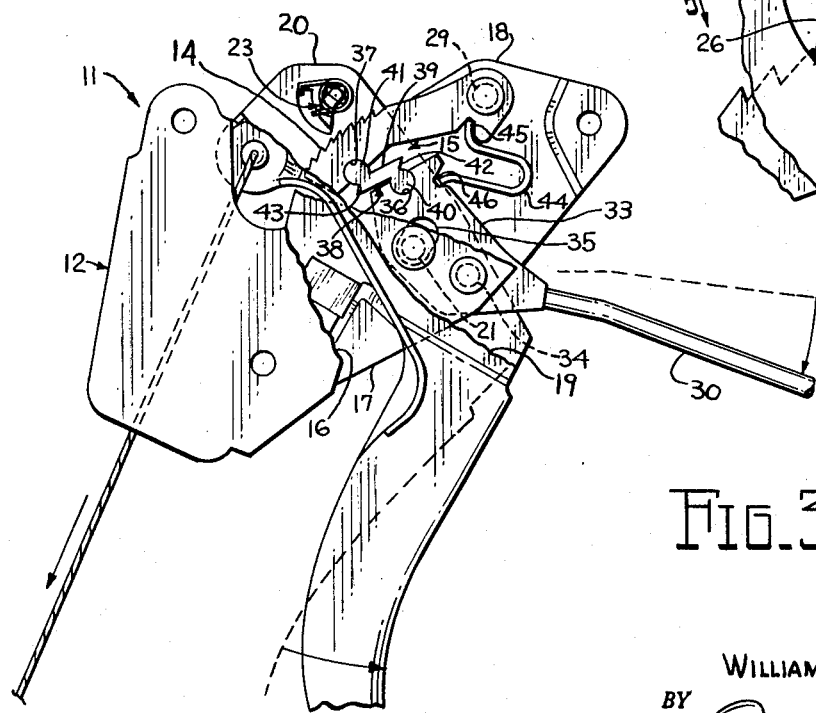
Fig. 3 is a view similar to Fig. 2 with the mechanism shown in a brake releasing position.

A line extended through the centers of the recesses 36 and 37 or through the centers of the heads 40 and 41 passes below the pivot 34 of the release member 33 when the brake is set. This relationship is necessary to enable secure and positive locking of the lever 13 when the pawl 23 is engaged with the ratchet rack 14 and to prevent accidental disengagement of the brake lever when it has been set. In this position, the pawl 23 exerts a downward force on the rack 14 due to the tension in the brake cable. This force is transmitted through the connector 38 to the release member 33 and, hence, acts against the pivot 34. With the described location of the recesses 36 and 37 and the connector 38, the force tends to urge the connector 38 in a clockwise direction which is resisted by the shoulders 42 and 43 bearing on the member 33 and the rack 14. Hence, the force of the brake cable, when the lever 13 is set, constantly urges the connector 38 to hold the brake locked in the set position. Once the release lever 30 has been moved downwardly and pushes the recess 36 upwardly (Fig. 3) so that a line extended through the centers of the recesses 36 and 37 now passes above the pivot 34, the force exerted on the ratchet rack 14 will cause the connector 38 to move in a counterclockwise direction and thereby aid in releasing the brake lever 13. It will be noted that in the present lever mechanism, the sector is retracted from the pawl, and the pawl itself is not disturbed during the initial releasing movement. Thus, a minimum force and movement are required on the release lever 30 and the handle 32 to release the foot lever 13 and to permit the brakes to be released.

A spring means 44 urges the free end of the member 33 downwardly to enable it to return to its original position after the lever 13 has been released and no more force is exerted on the handle 32. In one form this spring means may comprise a U-shaped spring held at its ends in indentations 45 and 46 in the ratchet 14 and the release plate 33, respectively.

To describe the complete operation of the brake operating assembly 11, pressure is applied on the toe plate 22 by the driver's foot to pivot the lever 13 in a clockwise direction about the pivot pin 21. The upper end of the lever 13 then moves upwardly toward the right and pulls on the brake cable. During this movement, the pawl 23 rides over the teeth of the ratchet rack 14 and the portion 26 of the pawl engages a tooth when pressure is released on the toe plate 22. Force is then exerted by the pawl 23 on the rack 14 due to the tension in the brake cable. This force is transmitted through the connector 38 and the release member 33 to the axis 34 and urges the connector 38 in a clockwise direction because a line through the axes of the recesses 36 and 37 passes below the pivot 34, on the side of the pivot 34 opposite to the direction in which the free end of the release member 33 is moved to release the brake. The parking brake thus remains securely set because clockwise movement of the connector 38 is resisted by the shoulders 42 and 43 bearing on the plate 33 and the rack 14. When the release lever 30 and the handle 32 are moved downwardly, thus causing the free end of the release member 33 to move upwardly, the segment 40 of the connector 38 and the recess 36 of the member 33 are also moved upwardly. When a line through the centers of the recesses 36 and 37 and the segments 40 and 41 passes the center of the pivot 34, the force on the rack 14 urges the connector 38 in a counterclockwise direction and thereby aids in further release of the rack 14 because the shoulders 42 and 43 do not resist movement of the connector 38 in that direction. When the rack 14 has thus been pulled out of engagement with the portion 26 of the pawl 23, the force exerted by the brake cable pulls the brake lever 13 back to its original position and the brake is released. The handle 32 can then be released and the release lever 30, the handle 32, and the release member 33 will move back to the original position due to the force exerted by the spring 44. The rack 14 will thereby be moved upwardly to its original position ready to be engaged again by the pawl 23 when the operator next desires to set the parking brake.

A parking brake according to the invention will thus be seen to comprise basically a pivoted ratchet rack engageable by a pawl that is connected to a brake setting lever. A release member is pivotally connected to the ratchet rack to enable the ratchet rack to be pulled out of engagement with the pawl when force is applied to the release member. A connector pivotally connects the release member and the ratchet rack with a line through the centers of the pivots extending past the side of the axis of the release member in a direction opposite to the direction in which the free end of the member is moved to release the ratchet. The connector also has shoulder means to limit movement of the connector in a direction opposite to the direction in which the connector must be moved to release the ratchet rack.

Various modifications will be suggested from the above description and the accompanying drawings and it will be understood that such modifications can be embodied in the invention without departing from the scope of it, as set forth in the claims appended hereto.

What I claim is:

1. In a foot-operated parking brake assembly having a mounting bracket, a brake-setting lever pivoted to said bracket, a pawl pivotally attached to a free end of said lever opposite to the end to which force is applied to set the brake, and a ratchet rack engageable with said pawl and pivoted to said bracket, the improvement which comprises a release member having a free end and pivoted to said mounting bracket at a point spaced from said ratchet rack, a pivot for said release member, a connector, connector pivots for pivotally attaching said connector to said member and to a portion of said ratchet rack opposite to the side on which the ratchet teeth are located, said connector pivots being so located that a line through the centers of said connector pivots extends on the side of the release member pivot opposite to that side toward which said connector is moved to pull said ratchet rack out of engagement with said pawl when the brake is set, and shoulder means affixed to said connector and positioned to bear against said release member and said ratchet rack to limit movement of said connector in a direction opposite to the direction in which said connector is moved to pull said ratchet rack out of engagement with said pawl.

2. Apparatus according to claim 1 characterized by a spring under compression between the ratchet rack and the free end of the release member for returning the release member to its original position after the brake has been released.

3. In a foot operated parking brake assembly having a mounting bracket lying generally in a vertical plane and a first class actuating lever pivoted to said bracket with a foot pedal on its lower end, the improvement comprising, in combination, a bifurcated upper portion on said actuating lever, the bifurcations thereof being parallel to said bracket and horizontally spaced from each other, a brake cable connection on said lever above the pivot point thereof with the cable extending rearwardly therefrom whereby forward movement of the upper portion of said lever applies brake setting tension to said cable, a pawl pivotally mounted by and extending horizontally across between said bifurcations, a generally arcuate ratchet rack pivotally mounted on a horizontal axis on said bracket and extending between said bifurcations of said actuating lever for engagement with said pawl, a spring urging said pawl toward engagement with said ratchet rack, a brake release member pivotally mounted on said bracket, said release member having a first, forwardly extending, release arm and a second arm extending toward said ratchet rack, and an over-center connector extending between and connected to said release member and said ratchet rack, whereby movement of said release member toward release urges said ratchet rack into contact with said pawl and then swings said ratchet rack out of contact from said pawl.

4. A parking brake lever according to claim 3 in which the connector is a single element pivotally connected at its opposite ends to the second arm of the release member and to the ratchet rack, respectively.

5. A parking brake lever according to claim 3 in which the pawl has an engagement edge having a horizontal length greater than the width of the teeth on the ratchet rack.

6. A parking brake lever according to claim 3 in which the ratchet rack is pivotally mounted on the bracket at the forward end of said ratchet rack and said ratchet rack extends rearwardly therefrom between the bifurcations of the actuating lever.

7. A parking brake lever according to claim 6 in which the ratchet rack has teeth on its upper surface and the pawl is urged downwardly into engagement with said teeth by the pawl spring.

References Cited in the file of this patent
UNITED STATES PATENTS

| | | |
|---|---|---|
| 647,782 | Zickefoose | Apr. 17, 1900 |
| 738,100 | Cuntz | Sept. 1, 1903 |
| 948,106 | Custer | Feb. 1, 1910 |
| 1,308,148 | Draeger | July 1, 1919 |
| 2,467,557 | Jandus | Apr. 19, 1949 |
| 2,632,338 | Sandberg | Mar. 24, 1953 |
| 2,676,659 | Emmer | Apr. 27, 1954 |
| 2,738,034 | Levine | Mar. 13, 1956 |
| 2,851,900 | Powell | Sept. 16, 1958 |
| 2,908,185 | Koskela | Oct. 13, 1959 |